US012678925B2

(12) United States Patent
Kuhls

(10) Patent No.: US 12,678,925 B2
(45) Date of Patent: Jul. 14, 2026

(54) POWER TOOL DYNAMIC MOTOR FIELD WEAKENING SYSTEM AND METHOD

(71) Applicant: Milwaukee Electric Tool Corporation, Brookfield, WI (US)

(72) Inventor: Alex R. Kuhls, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 240 days.

(21) Appl. No.: 18/582,368

(22) Filed: Feb. 20, 2024

(65) Prior Publication Data

US 2024/0278409 A1 Aug. 22, 2024

Related U.S. Application Data

(60) Provisional application No. 63/486,159, filed on Feb. 21, 2023.

(51) Int. Cl.
H02P 21/00 (2016.01)
B25F 5/00 (2006.01)

(52) U.S. Cl.
CPC .......... B25F 5/005 (2013.01); H02P 21/0089 (2013.01)

(58) Field of Classification Search
CPC ...... B25F 5/005; H02P 21/0089; H02P 21/14; H02K 29/08; B25B 23/147
See application file for complete search history.

(56) References Cited

U.S. PATENT DOCUMENTS

| | | | |
|---|---|---|---|
| 6,605,912 B1 * | 8/2003 | Bharadwaj .......... | H02P 21/0089 318/722 |
| 2001/0043806 A1 * | 11/2001 | Gorti ...................... | H02K 29/08 388/800 |
| 2005/0229671 A1 | 10/2005 | Lefavour et al. | |
| 2011/0309781 A1 * | 12/2011 | Tomigashi .............. | H02P 21/14 318/504 |
| 2021/0244973 A1 | 8/2021 | Van den Brink et al. | |
| 2022/0216746 A1 | 7/2022 | Yoneda et al. | |
| 2022/0224258 A1 * | 7/2022 | Rajzer ................... | B25B 23/147 |

* cited by examiner

*Primary Examiner* — Cortez M Cook
(74) *Attorney, Agent, or Firm* — Quarles & Brady LLP

(57) ABSTRACT

Embodiments of the disclosure provide a system and method of operating a motor control algorithm in a power tool to utilize dynamic field weakening. The method includes operating the motor according to dynamic field weakening, measuring sensor readings, and sampling the sensor readings. The method also includes calculating an averaged sensor reading value, comparing the averaged sensor reading value to a predetermined sensor value, and continuing to operate according to dynamic field weakening if the averaged sensor reading has not exceeded the predetermined sensor value. The method further includes changing the motor control algorithm to a static motor commutation sequence if the averaged sensor reading has exceeded the predetermined sensor value.

19 Claims, 3 Drawing Sheets

POWER TOOL DYNAMIC MOTOR FIELD WEAKENING SYSTEM AND METHOD

BACKGROUND

Power tools, such as hydraulic power tools, generate high amounts of force to complete a wide variety of applications. Particularly, hydraulic crimping tools in the high force range typically use a two-stage hydraulic pump design. Hydraulic crimpers that use two-stage pumps have much longer cycle times than tools with single-stage pumps, because more oil is compressed in a two-stage pump and because the motor speed is dictated by the torque or power needed for stage two of the two-stage cycle.

SUMMARY

An example embodiment of the disclosure provides solutions to these problems by providing improved systems and methods for reducing overall cycle time by providing feedback to the motor control unit. Some particular embodiments of the disclosure can be used to optimize overall performance for single-stage pumps in hydraulic tools. In other embodiments, the sensor feedback can be used to determine when a two-stage pump hydraulic cycle has transitioned from stage one to stage two. In some particular embodiments, the ability to increase the no load speed of the motor in stage one and then transition back to static commutation in stage two reduces the overall cycle time and these modifications to motor performance would be beneficial to optimize overall tool performance.

Embodiments of the disclosure provide systems and methods of changing a motor control algorithm in a power tool to utilize dynamic field weakening. The power tool includes a motor, a stator, and a sensor. The method includes operating the motor according to dynamic field weakening by operating the motor above a rated speed by weakening a magnetic field of the stator. The method also includes measuring sensor readings, sampling the sensor readings while the motor is running to generate sensor reading samples, and calculating an averaged sensor reading value by averaging the sensor reading samples. The method further includes comparing the averaged sensor reading value to a predetermined sensor value, continuing to operate according to dynamic field weakening if the averaged sensor reading has not exceeded the predetermined sensor value, and changing the motor control algorithm to a static motor commutation sequence if the averaged sensor reading has exceeded the predetermined sensor value. In some embodiments, the power tool is a hydraulic power tool and the sensor is a pressure sensor.

DETAILED DESCRIPTION

Figure 1A:
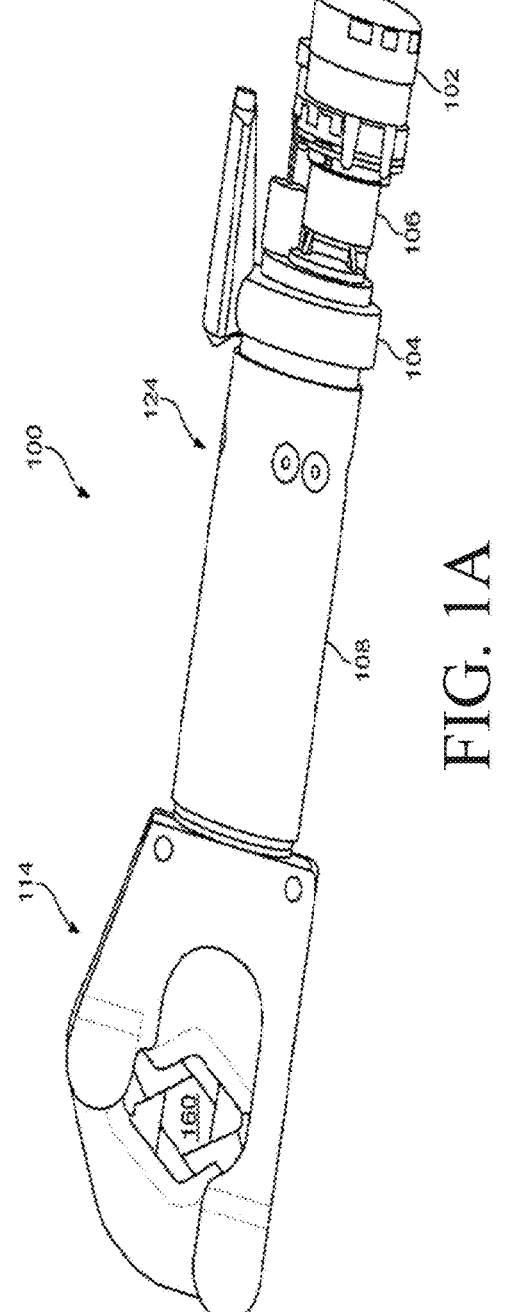
FIG. 1A is an isometric view of a hydraulic power tool, according to an example embodiment.

The following detailed description describes various features and functions of the disclosed method with reference to the accompanying figures. The illustrative methods described herein are not meant to be limiting. It may be readily understood that certain aspects of the disclosed method can be arranged and combined in a wide variety of different configurations, all of which are contemplated herein.

The disclosure generally relates to the dynamic motor field weakening using a sensor. Dynamic field weakening is a motor control technique that allows the motor to operate at speeds above its rated speed by weakening the magnetic field in the motor's stator. By reducing the magnetic field strength, the back electromotive force (EMF) decreases, enabling the motor to rotate at higher speeds. Using field weakening, the strength of gap field can be reduced, which reduces the back-EMF for a given speed. The lower back EMF constant (torque constant) caused by the field weakening thus allows the motor to be run at a higher speed. Typically, this can double available motor speed.

In embodiments of the disclosure, the sensor can be a pressure sensor, a distance sensor, a battery current sensor, a hall effect sensor, or even a temperature sensor. The disclosure can be applied to enhance performance in a single-stage hydraulic tool or a multi-stage hydraulic tool, not limited to a two-stage hydraulic tool. The firmware algorithm that alters the motor control algorithm based on dynamic field weakening and sensor feedback can be used to determine when the hydraulic cycle has transitioned from one stage to another, for example, from stage one to stage two.

The firmware algorithm can be implemented in a variety of tools, including but not limited to a cutting tool, a punching tool, a crimping tool, a screwdriver, a rivet tool, a ratchet, a press tool, an expander tool, a drilling tool, or a grinding tool. Each tool can have an actuator with a moveable component that is configured to implement at least one functionality on a work piece that the tool contacts.

The present disclosure may employ brushless motors. Brushless motors use a permanent magnet that rotates to change the direction of a magnetic field generated by surrounding stationary coils. Additionally, the magnitude and direction of the current into these coils can be changed to control the rotation of the permanent magnet. Brushless motors are advantageous, because they can control continuously at maximum rotational force. However, the disclosure could also be applied to brushed motors or other types of motors. Brushless motors can be controlled through a variety of control algorithms to alter or modify how the brushless motor runs. For instance, a motor can be controlled to run at a higher speed during unloaded conditions, lower speed during loaded conditions, higher torque during specific loads, or higher peak power. These modifications to motor performance can be used to optimize tool performance.

For tools in the low force range (e.g., six tons), a single stage hydraulic pump design is often used. For tools in the high force range (e.g., above six tons), a two-stage hydraulic pump design is often used. However, in some embodiments the disclosure can also be applied to tools with a three-stage or multi-stage hydraulic pump design. Stage one is designed to move a large amount of oil under low pressure conditions, and stage two is designed to move a small amount of oil under high pressure conditions. Additional stages can be designed to move varying amounts of oil under different pressure conditions.

Hydraulic crimpers that use two-stage pumps have much longer cycle times than tools with single stage pumps. This is because there is more oil to move than in a single stage system and because the motor speed is dictated by the torque and power needed for stage two. The disclosure describes a hydraulic crimper, but the disclosure could also be applied to other types of hydraulic tools, such as hydraulic cutters or hydraulic punches, which may have different cycle times and oil movement requirements.

FIG. 1A illustrates components of a hydraulic power tool, according to an example embodiment. Although the example implementation references an example crimping tool, it is understood that the features of this disclosure can be implemented in other similar hydraulic power tools, such as cutting tools, punching tools, or drilling tools. As one example, the illustrated hydraulic tool 100 includes a working head that utilizes a hex or six-sided crimping head 114. The hydraulic crimping tool 100 includes an electric motor 102 configured to drive a pump 104 through a gear reducer 106. The pump 104 provides pressurized hydraulic fluid to a hydraulic circuit 124 including a hydraulic actuator cylinder 108, which includes a piston or ram. However, the hydraulic actuator cylinder can also include other types of actuators, such as a rotary actuator or a linear actuator.

Figure 1B:
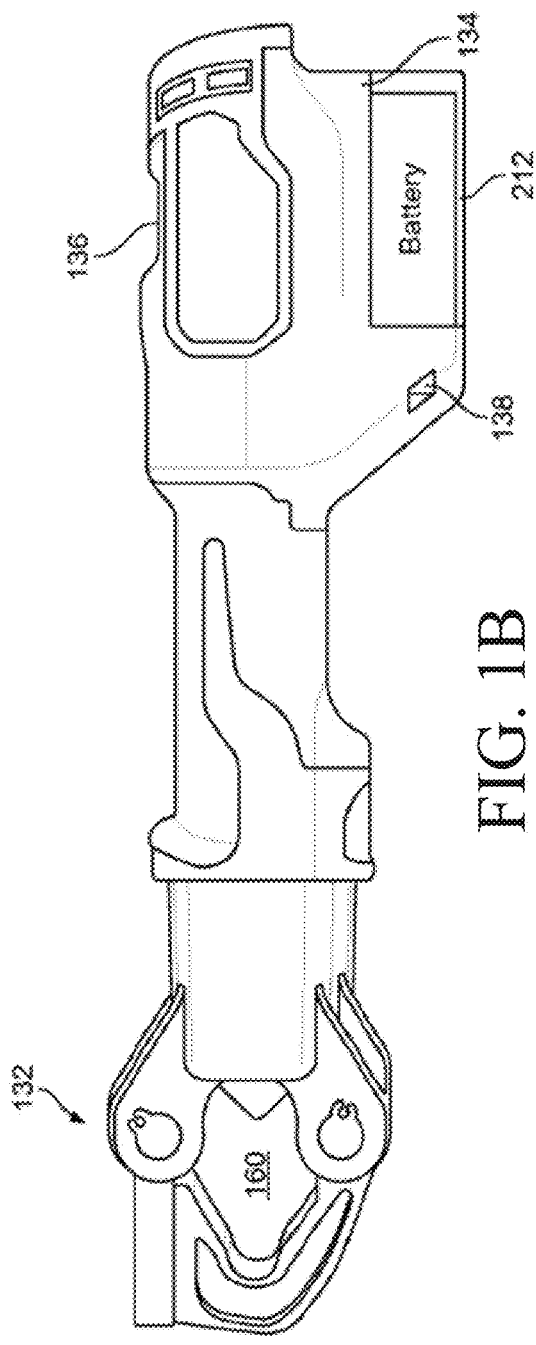
FIG. 1B is an isometric view of an alternative hydraulic power tool including a punch-style crimping head, according to an example embodiment.

FIG. 1B illustrates an alternative hydraulic power tool, including a punch-style crimping head, according to an example embodiment. In one example and as shown in FIG. 1B, a user interface 136 can be positioned along a top surface of the hydraulic tool. The hydraulic tool may also include a trigger switch 138 mounted along the bottom portion of the hydraulic tool near a battery 212. However, the user interface can also be positioned along a side surface or a bottom surface of the hydraulic tool, and the trigger switch can be mounted along the top portion or a side portion of the hydraulic tool.

Figure 2:
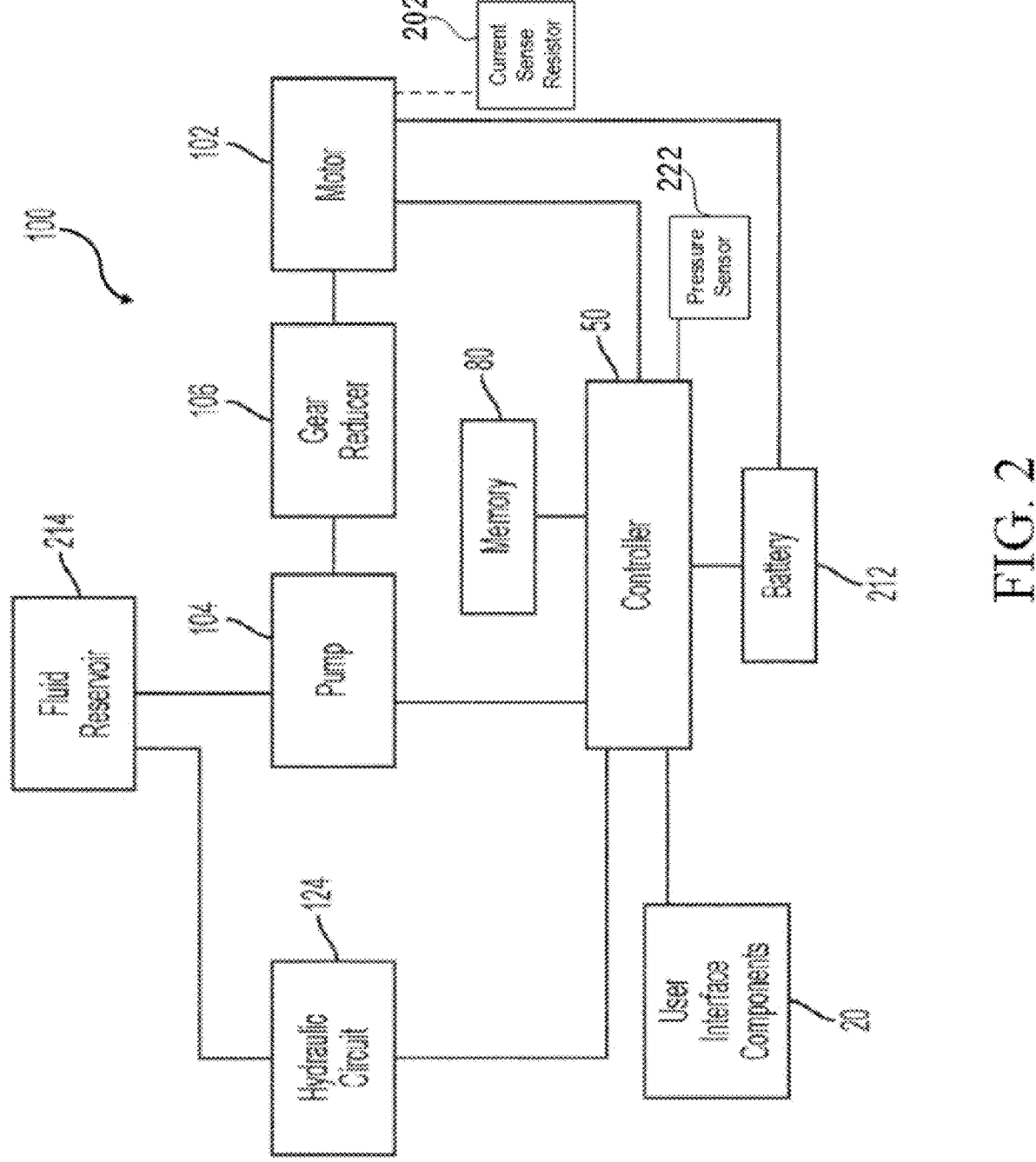
FIG. 2 is a block diagram of certain components of the hydraulic power tool illustrated in FIG. 1.

FIG. 1A and FIG. 2 illustrate the drive motor 102, the hydraulic pump 104, the torque converter or gear reducer 106, a fluid distribution network 124, a system controller 50, and a battery 212. The tool shaft 108 extends from the torque converter 106, the handle top switch 114 is located at the upper end of the handle, and the fluid distribution network or hydraulic circuit 124 is connect to the liquid storage container 214. The system controller 50 interfaces with the data storage unit 80 and controls the drive motor 102 through the electrical feedback component 202. The battery 212 is located within the battery base 134 of the power tool assembly 100. However, the battery 212 can also be disposed within a different part of the power tool assembly, such as the handle or the motor housing.

FIG. 2 illustrates a block diagram of a hydraulic and electronic control system for the hydraulic tools 100 of FIGS. 1A and 1B. FIG. 2 illustrates user interface components 20, the controller 50, a data storage unit or memory 80, an electrical feedback component or current sense resistor 202, and the battery 212. The hydraulic tool 100 can include user interface components 20 that provide input to the power tool, such as a controller 50 (also referred to as a motor control unit or a motor inverter). The controller 50 includes a processor connected to memory 80 and user interface components 20. For example, such user interface components 20 can include an operator panel, one or more switches, one or more push buttons, one or more interactive indicating lights, soft touch screens or panels, other types of similar switches such as a trigger switch, and any combination of the aforementioned. The memory 80 can include instructions that, when executed by the processor, cause the controller 50 to operate the tool 100. However, the memory can also include other types of data, such as sensor readings or user input.

The hydraulic pump 104 is connected to the drive motor 102, the torque converter 106 is connected to the hydraulic pump 104, the fluid distribution network 124 is connected to the hydraulic pump 104, and the pressure sensor 222 is connected to the system controller 50. In some embodiments, the hydraulic pump 104 can also be connected to a different component, such as the torque converter 106 or the fluid distribution network 124. Further, in some embodiments, the pressure sensor 222 can also be connected to a different component, such as the hydraulic pump 104 or the fluid distribution network 124.

As also shown in FIG. 2, the tool 100 includes a fluid reservoir 214 that is in fluid communication with a hydraulic circuit 124 and the pump 104. The pressure sensor 222 (or a distance sensor, a battery current sensor, or a hall effect sensor) can be connected to the controller 50 and a current sense resistor 202 can be connected in series with the controller 50 and the motor 102. The battery 212 can be removably connected to a portion of the hydraulic tool. As shown in FIG. 1A, the battery 212 can be removably connected to a bottom portion 134 of the hydraulic tool away from the crimping head. In some embodiments, the battery can be removably connected to a different portion of the hydraulic tool, such as the top portion or a side portion. In some embodiments, the current sense resistor 202 can be connected in parallel with the controller 50 and the motor 102.

Figure 3:
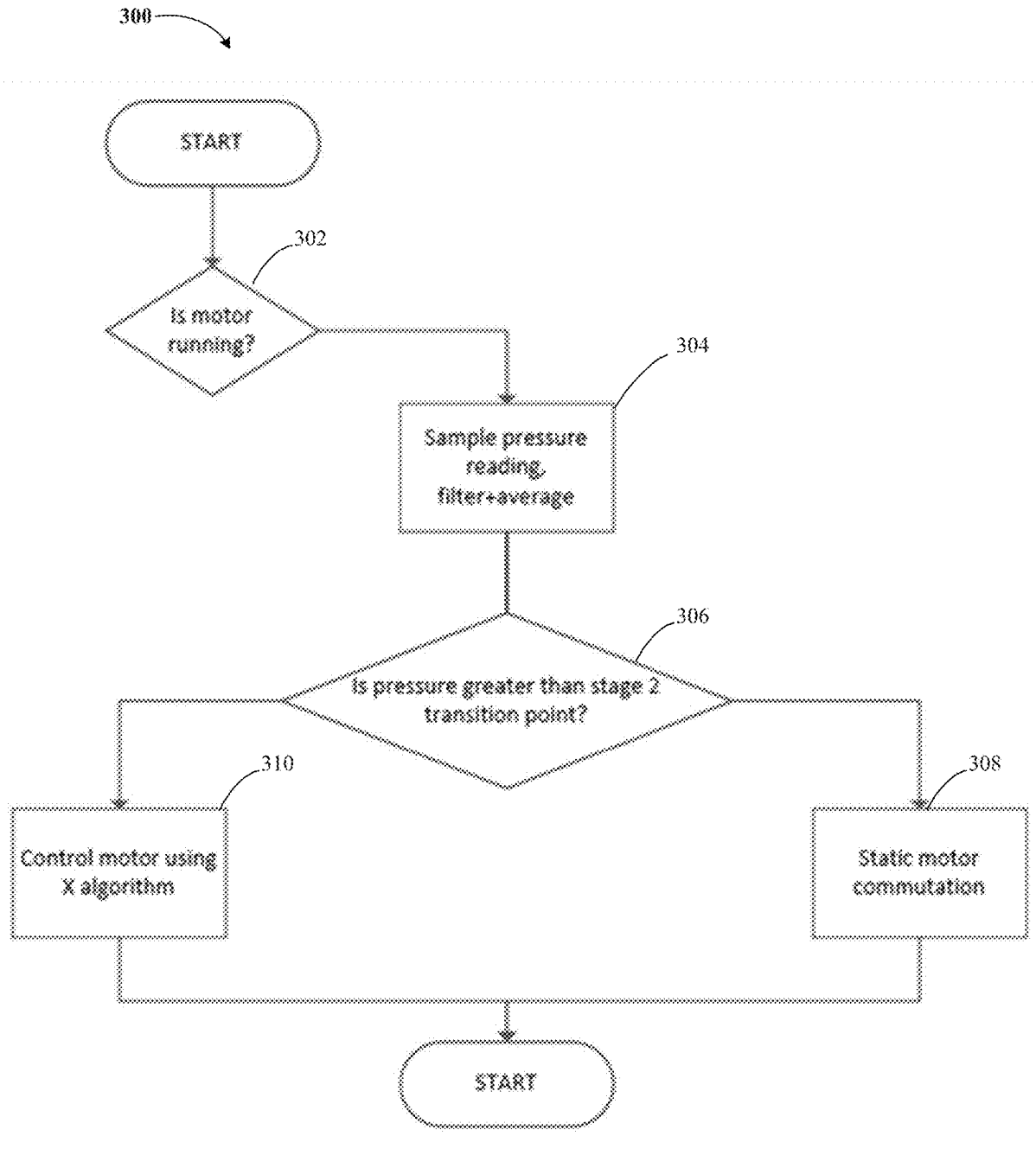
FIG. 3 is a flowchart of an example firmware algorithm method utilized in the hydraulic power tool of FIG. 1.

FIG. 3 illustrates a flowchart of a firmware algorithm process 300 that uses sensor readings as feedback to determine when the two-stage hydraulic cycle has transitioned from stage one to stage two, according to one embodiment of a method of the disclosure. At a first step 302, the sensor readings are used to determine if the motor is running. If the motor is running, the system (at 304) samples the sensor readings while the motor is running. Next, the system (at 306) averages the sampled sensor readings and compares the average sensor reading value to a pre-determined sensor value. If the average sensor reading is below the threshold, the motor control algorithm (at 310) can change based on the sensor feedback. If the average sensor reading is above a threshold, the motor commutation (at 308) can remain static. The steps shown in FIG. 3 are not all-inclusive, and the system may also include additional steps.

Still referring to FIG. 3, in this embodiment, a low-level firmware algorithm is used. However, in additional embodiments, a high-level firmware algorithm can be used. The high-level firmware algorithm can be deployed within a flash memory chip and allow for updates to be made. In still further embodiments, the algorithm can be implemented within subsystems. These subsystems can be semi-independent devices that are part of a more extensive system. The firmware can be embedded within a central processing unit, a flash chip, a liquid crystal display unit, or another type of controller. The firmware can be a basic input/output system (BIOS), an extensible firmware interface (EFI), or another type of firmware.

FIG. 3 illustrates an algorithm with a looped sequence of events. However, in other embodiments, this algorithm can be modified to include a linear sequence of events that restarts after completion. Additionally, this embodiment illustrates different relevant measurements being taken in series. However, in further embodiments, measurements can be taken at the same time or in a different order. In this embodiment, the controller 50 determines (at 302) whether the motor 102 is running. In some embodiments, this determination can be based on the controller 50 measuring battery current draw using a current sense resistor 202 in series with the motor. The current sense resistor 202 can be a two-terminal current sense resistor. In other embodiments, the current sense resistor 202 can be a four-terminal current sense resistor that provides two terminals for the current path. In other embodiments, the controller 50 can use other methods to detect the battery current draw, including current sensing amplifiers, coulomb counting, a separate battery monitoring circuit, tracking the offset voltage, or another suitable method of detecting battery current draw.

If the motor 102 is running, the controller 50 samples (at 304) the pressure sensor (or a distance sensor, a battery current sensor, or a hall effect sensor) readings to generate pressure sensor reading samples. For example, the controller 50 can sample (at 304) the pressure sensor reading at least once per millisecond. The controller 50 can also calculate an averaged pressure sensor reading value using pressure sensor reading samples. In some embodiments, the controller can also sample the sensor reading at a different frequency, such as at least once per second or at least once per microsecond.

The controller 50 determines (at 306) whether the averaged pressure sensor reading value exceeds a pre-determined pressure sensor reading value (e.g., a stage two transition point). If the averaged pressure sensor reading value exceeds the pre-determined pressure sensor reading value, the controller 50 determines (at 308) that the two-stage hydraulic cycle has transitioned from stage one to stage two, changes the motor control algorithm and generates a command to begin a static motor commutation sequence. If, however, the averaged pressure sensor reading value does not exceed the pre-determined pressure sensor reading value, the controller 50 determines (at 310) that the two-stage hydraulic cycle has not transitioned from stage one, does not change the motor control algorithm, and continues operation of the tool using the dynamic field weakening motor control algorithm. In some embodiments, the controller 50 can also change the motor control algorithm based on a different type of feedback, such as user input or diagnostic test results.

Thus, in some embodiments of the disclosure, the process 300 can be used to determine that a two-stage hydraulic cycle has transitioned from stage one to stage two, using a sensor, and dynamically change the motor control algorithm when an averaged sensor reading value is greater than a predetermined sensor reading value. The process can also be used to determine that a multi-stage hydraulic cycle has transitioned from one stage to another stage. In some embodiments, the process can use a different type of sensor, and the process can dynamically change the motor control algorithm when a different type of sensor reading value is greater than a predetermined sensor reading value.

In one particular embodiment of the disclosed technology, the control algorithm employed is dynamic field weakening. Field weakening, also referred to as flux weakening, can be used to increase the speed of an electric motor beyond its rated capacity at the cost of reduced torque. This method is particularly useful in scenarios where a higher motor speed is desirable and a lower torque is acceptable. Conversely, no longer using field weakening can be employed when there is a demand for higher torque and a lower motor speed is acceptable.

Field weakening involves adjusting the phase of the motor's drive current. This adjustment allows the motor to be operated by a drive voltage that is less than the back electromotive force (back-EMF) of the motor. As previously discussed, the present disclosure can include a brushless motor that contains a permanent magnet. These brushless motors can be designed with rotor magnets that are directly facing an air gap to a stator. Alternatively, the magnets can be mounted interior to the rotor, with the flux directed to the gap through a permeable magnetic material.

Each of these configurations can be effectively used with dynamic field weakening, and each configuration offers its own set of advantages for various applications. Generally speaking, field weakening maintains the available power of a motor nearly constant over a two-to-one speed ratio. Furthermore, the higher available voltage facilitated by field weakening allows for higher output power levels.

In the context of the present disclosure, the motor control algorithm can be used to increase the no-load speed of the motor at the cost of increased current and reduced battery life. Field weakening can be employed to accelerate stage one of the crimping process at increased current and reduced battery life, and then transition back to static commutation once stage two is reached in order to conserve battery life. This approach effectively reduces the overall cycle time and helps conserve battery life.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general purpose computer including various computer hardware, software, firmware, and so on, consistent with the discussion below. As specific examples, a control device can include a processor, a micro-controller, a field-programmable gate array, a programmable logic controller, logic gates etc., and other typical compo-nents that are known in the art for implementation of appropriate functionality (e.g., memory, communication systems, power sources, user interfaces and other inputs, etc.). The term "article of manufacture" as used herein is intended to encompass a computer program accessible from any computer-readable device, carrier (e.g., non-transitory signals), or media (e.g., non-transitory media).

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations repre-sented in the figures, or otherwise disclosed herein, can be executed in different orders than are expressly illustrated or described, as appropriate for particular embodiments of the disclosure. Further, in some embodiments, certain opera-tions can be executed in parallel, including by dedicated parallel processing devices, or separate computing devices configured to interoperate as part of a large system.

As used herein in the context of computer implementa-tion, unless otherwise specified or limited, the terms "com-ponent," "system," "module," and the like are intended to encompass part or all of computer-related systems that include hardware, software, a combination of hardware and software, or software in execution. For example, a compo-nent may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other pro-cessor devices, or may be included within another compo-nent (or system, module, and so on).

Various features and advantages of the disclosure are set forth in the following claims.

The invention claimed is:

1. A method of changing a motor control algorithm in a power tool, the power tool including a motor, a stator, and a sensor, the method comprising:

operating, via a controller connected to the motor, the motor according to dynamic field weakening by oper-ating the motor above a rated speed by weakening a magnetic field of the stator;

measuring pressure sensor readings using a pressure sen-sor;

sampling the pressure sensor readings using the pressure sensor while the motor is running to generate pressure sensor reading samples;

calculating, via the controller, an averaged pressure sen-sor reading value by averaging the pressure sensor reading samples;

comparing, via the controller, the averaged pressure sen-sor reading value to a predetermined pressure sensor value;

continuing to operate the motor according to the dynamic field weakening if the averaged pressure sensor reading has not exceeded the predetermined pressure sensor value; and changing the motor control algorithm to a static motor commutation sequence if the averaged sensor reading has exceeded the predetermined sensor value.

2. The method of claim 1 wherein the power tool is a hydraulic power tool; and further comprising determining a hydraulic cycle has transitioned from stage one to stage two when the averaged pressure sensor reading value exceeds the predetermined pressure sensor value.

3. The method of claim 1 and further comprising mea-suring readings from at least one of a distance sensor, a battery current sensor, or a hall effect sensor.

4. The method of claim 1 wherein the pressure sensor is in series with the controller and the motor.

5. The method of claim 1 and further comprising mea-suring readings from a current sense resistor in series with the motor.

6. The method of claim 5 and further comprising mea-suring readings from at least one of a two-terminal current sense resistor or a four-terminal current sense resistor.

7. The method of claim 1 and further comprising detecting battery current draw using at least one of a current sensing amplifier, coulomb counting, or a battery monitoring circuit.

8. The method of claim 1 and further comprising sampling the pressure sensor readings at a range between about once per microsecond and about once per second.

9. The method of claim 1 wherein the power tool is a hydraulic power tool; and further comprising determining whether the averaged pressure sensor reading value exceeds the predetermined pressure sensor value to determine whether a two-stage hydraulic cycle has transitioned from stage one to stage two.

10. The method of claim 9 and further comprising gen-erating a command to begin a static motor communication sequence if the two-stage hydraulic cycle has transitioned from stage one to stage two.

11. The method of claim 9 and further comprising con-tinuing to operate according to dynamic field weakening if the two-stage hydraulic cycle has not transitioned from stage one to stage two.

12. The method of claim 1 and further comprising chang-ing the motor control algorithm to the static motor commu-tation sequence to reduce power consumption.

13. The method of claim 1 and further comprising oper-ating according to dynamic field weakening despite a reduc-tion in torque.

14. The method of claim 1 and further comprising oper-ating according to dynamic field weakening to maintain available power of the motor nearly constant over a speed ratio.

15. The method of claim 1 and further comprising oper-ating according to dynamic field weakening to increase current and a no load speed of the motor.

16. The method of claim 1 wherein the power tool is a hydraulic crimping tool; and further comprising accelerating stage one of a crimping process at increased current and reduced battery life.

17. The method of claim 16 and further comprising transitioning to the static motor commutation sequence in order to conserve battery life.

18. A hydraulic power tool comprising:

a motor with a stator;

a pump;

a fluid distribution network in fluid communication with the pump;

a pressure sensor in communication with the fluid distribution network; and a controller connected to the motor and the pressure sensor;

the controller operating the motor according to dynamic field weakening by operating the motor above a rated speed by weakening a magnetic field of the stator;

the controller measuring pressure sensor readings;

the controller sampling the pressure sensor readings while the motor is running to generate pressure sensor reading samples;

the controller calculating an averaged pressure sensor reading value by averaging the pressure sensor reading samples;

the controller comparing the averaged pressure sensor reading value to a predetermined pressure sensor value; and the controller continuing to operate according to dynamic field weakening if the averaged pressure sensor reading value has not exceeded the predetermined pressure sensor value; and the controller changing a motor control algorithm to a static motor commutation sequence if the averaged pressure sensor reading has exceeded the predetermined pressure sensor value.

19. The hydraulic power tool of claim 18 wherein the controller determines a hydraulic cycle has transitioned from stage one to stage two when the averaged pressure sensor reading value exceeds the predetermined pressure sensor value.

* * * * *